United States Patent
Ortiz et al.

(10) Patent No.: US 8,210,193 B2
(45) Date of Patent: Jul. 3, 2012

(54) SUN SHADE PROTECTOR

(76) Inventors: Jose G. Ortiz, Dallas, TX (US); Belen Ortiz, Dallas, TX (US)

( * ) Notice: Subject to any disclaimer, the term of this patent is extended or adjusted under 35 U.S.C. 154(b) by 0 days.

(21) Appl. No.: 12/467,696

(22) Filed: May 18, 2009

(65) Prior Publication Data
US 2009/0308421 A1 Dec. 17, 2009

Related U.S. Application Data

(60) Provisional application No. 61/132,224, filed on Jun. 17, 2008.

(51) Int. Cl.
*E04H 15/02* (2006.01)
*E04H 15/06* (2006.01)
*A47C 7/62* (2006.01)

(52) U.S. Cl. ............... 135/88.04; 135/96; 297/184.11; 297/184.17

(58) Field of Classification Search ............... 135/88.01, 135/88.02, 88.04, 133, 88.03, 96; 297/184.1, 297/184.11, 184.13, 184.15, 184.17
See application file for complete search history.

(56) References Cited

U.S. PATENT DOCUMENTS

| | | | |
|---|---|---|---|
| 3,190,300 A * | 6/1965 | Wear | 135/126 |
| 4,355,650 A * | 10/1982 | Beaudry | 135/130 |
| 4,720,074 A | 1/1988 | Gard et al. | |
| 5,022,420 A | 6/1991 | Brim | |
| 5,836,327 A | 11/1998 | Davis | |
| 6,105,594 A | 8/2000 | Diaz | |
| 6,533,237 B1 | 3/2003 | Matusek | |
| 2007/0251557 A1* | 11/2007 | Carter et al. | 135/25.4 |
| 2008/0023052 A1* | 1/2008 | Barreiro | 135/16 |
| 2008/0202573 A1* | 8/2008 | Corbiere | 135/96 |

* cited by examiner

*Primary Examiner* — David Dunn
*Assistant Examiner* — Danielle Jackson
(74) *Attorney, Agent, or Firm* — James Ray & Assoc

(57) ABSTRACT

An apparatus for providing protection from rays from the sun while performing outdoor tasks including at least one of mowing a lawn with a lawn mower and pushing a stroller. The apparatus comprises a sunshade having a predetermined shape, a predetermined size and formed of a first predetermined material. A frame member includes at least two substantially U-shaped members and is engageable with an underside of the sunshade. A respective one of a pair of elongated members is engageable at a first end thereof with a respective end of one of the at least two substantially U-shaped members and is further engageable on a second end with a handle of at least one of a lawn mower and a stroller. One of a clamp and a screw member is used for securing the pair of elongated members to such handle of such lawn mower and such stroller.

7 Claims, 3 Drawing Sheets

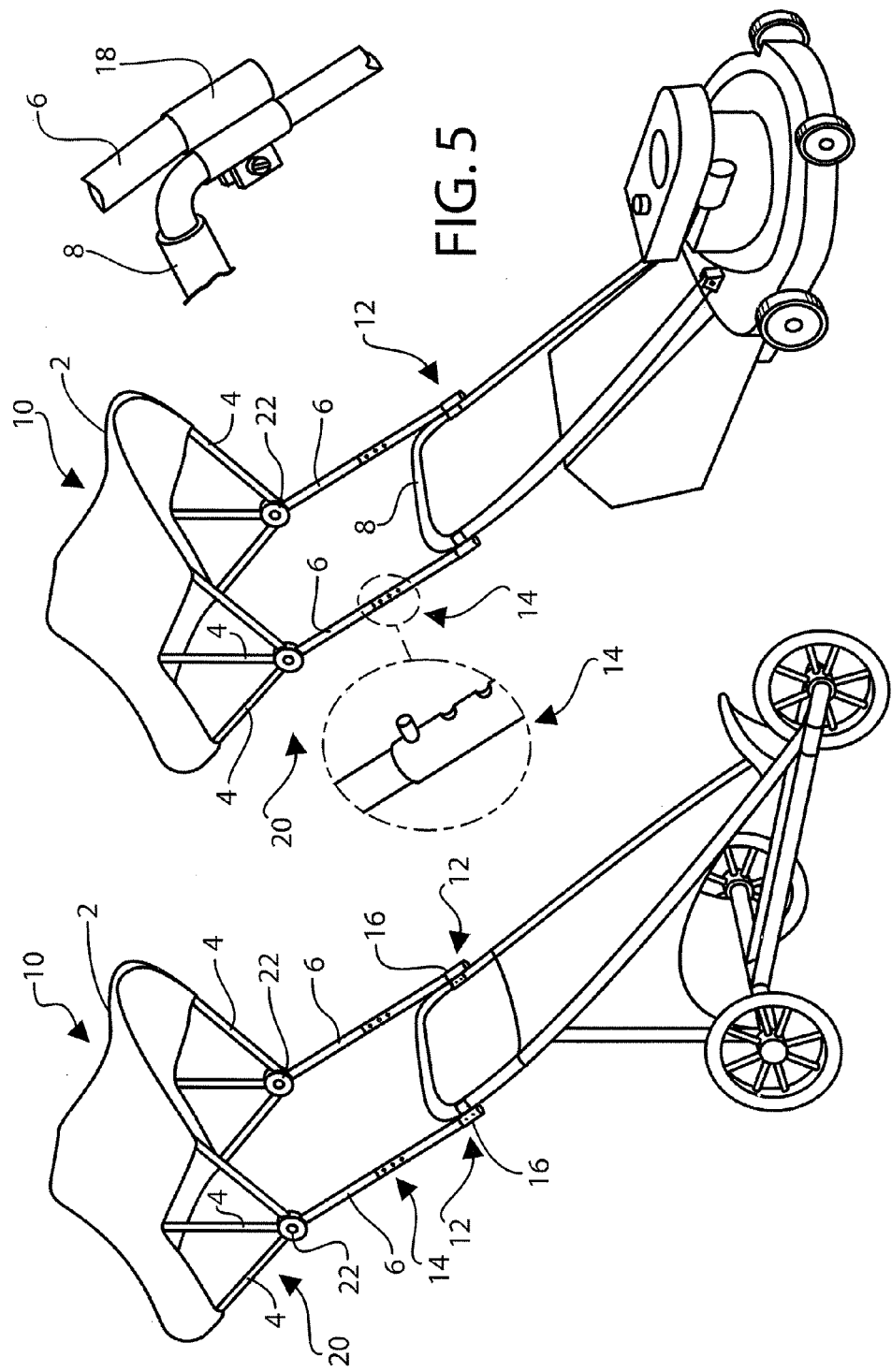

SUN SHADE PROTECTOR

CROSS REFERENCE TO RELATED APPLICATIONS

This application is closely related to and claims benefit from U.S. Provisional Application Ser. No. 61/132,224 filed Jun. 17, 2008.

FIELD OF THE INVENTION

The present invention relates, in general, to an apparatus for providing protection from the sun, and, more particularly, the present invention relates to an apparatus that be attached to lawnmowers or strollers for preventing skin from being damaged by the sun or becoming wet due to rain.

BACKGROUND OF THE INVENTION

In order to complete certain tasks, one must work in the sunlight. These activities include mowing the lawn or taking a young child for a walk in a stroller. The sun can be increasingly warm as the day goes on and can cause painful burns on one's skin. The harmful UV rays given off by the sun can also damage one's eyes. Too much exposure to the sun may lead to dehydration or even skin cancer.

Thus, it would be advantageous if there were a simple and relatively inexpensive means that would enable a user performing such outdoor activities to protect himself from the suns rays.

SUMMARY OF THE INVENTION

In a first aspect the present invention provides an apparatus for providing protection from rays from the sun while performing outdoor tasks including at least one of mowing a lawn with a lawn mower and pushing a stroller. The apparatus comprises a sunshade having a predetermined shape, a predetermined size and formed of a first predetermined material. A frame member including at least two substantially U-shaped members is engageable with an underside of the sunshade. The frame member is formed of a second predetermined material. A respective one of a pair of elongated members engageable at a first end thereof with a respective end of one of the at least two substantially U-shaped members and is further engageable on a second end with a handle of such at least one of such lawn mower and such stroller. There is a means for securing the pair of elongated members to such handle of such at least one of such lawn mower and such stroller.

OBJECTS OF THE INVENTION

It is, therefore, one of the primary objects of the present invention to provide an apparatus for providing protection from the sun's rays when performing outdoor chores tasks including at least one of mowing a lawn with a lawn mower and pushing a stroller.

Another object of the present invention is to provide an apparatus for providing protection from the sun's rays that is easy to install.

Still another object of the present invention is to provide an apparatus for providing protection from the sun's rays when performing outdoor chores tasks including at least one of mowing a lawn with a lawn mower and pushing a stroller that is relatively inexpensive.

In addition to the various objects and advantages of the invention which have been described in some specific detail above it should be noted that various other objects and advantages of the present invention will become more readily apparent to those persons who are skilled in the relevant art from the following more detailed description, particularly when such description is taken in conjunction with the appended claims.

BRIEF DESCRIPTION OF THE DRAWINGS

FIG. 3 is a side perspective view of the apparatus shown in FIG. 1 as used with a stroller.

FIG. 4 is a side perspective view of the apparatus shown in FIG. 1 as used with a lawn mower and also shows an enlarged view of the telescoping means.

FIG. 5 is a side perspective view of the clamp used to engage the apparatus with the handle of a lawn mower.

Figure 1:
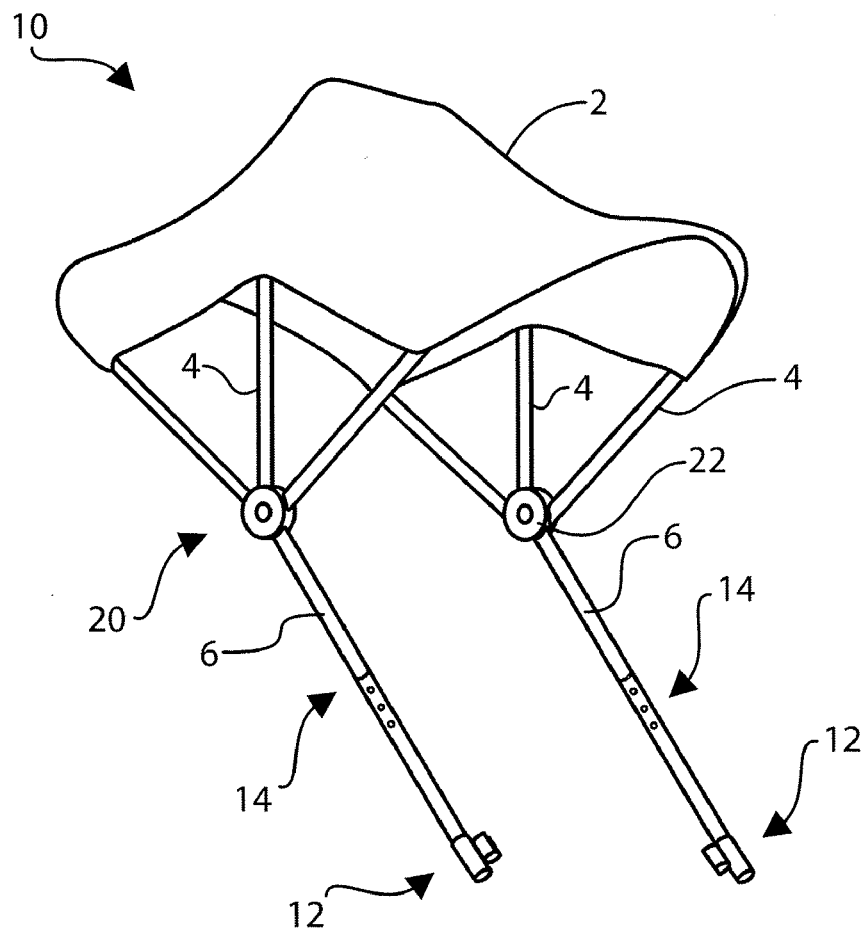
FIG. 1 is a side perspective view of the apparatus according to an embodiment of the invention.
Figure 2:
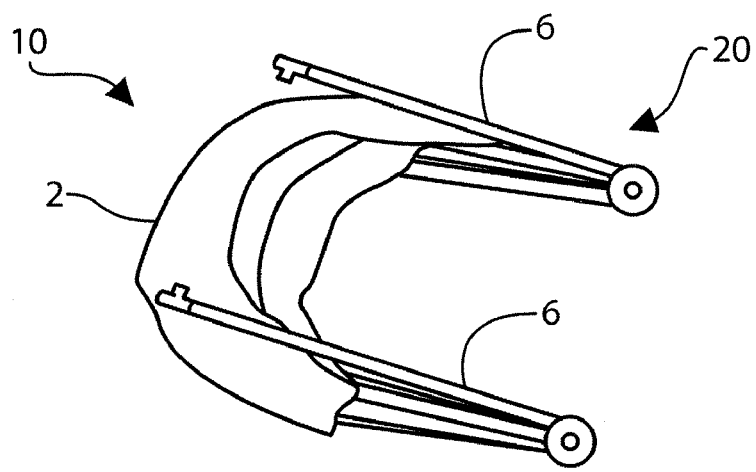
FIG. 2 is a perspective view of the apparatus shown in FIG. 1 closed up when not in use.
Figure 6:
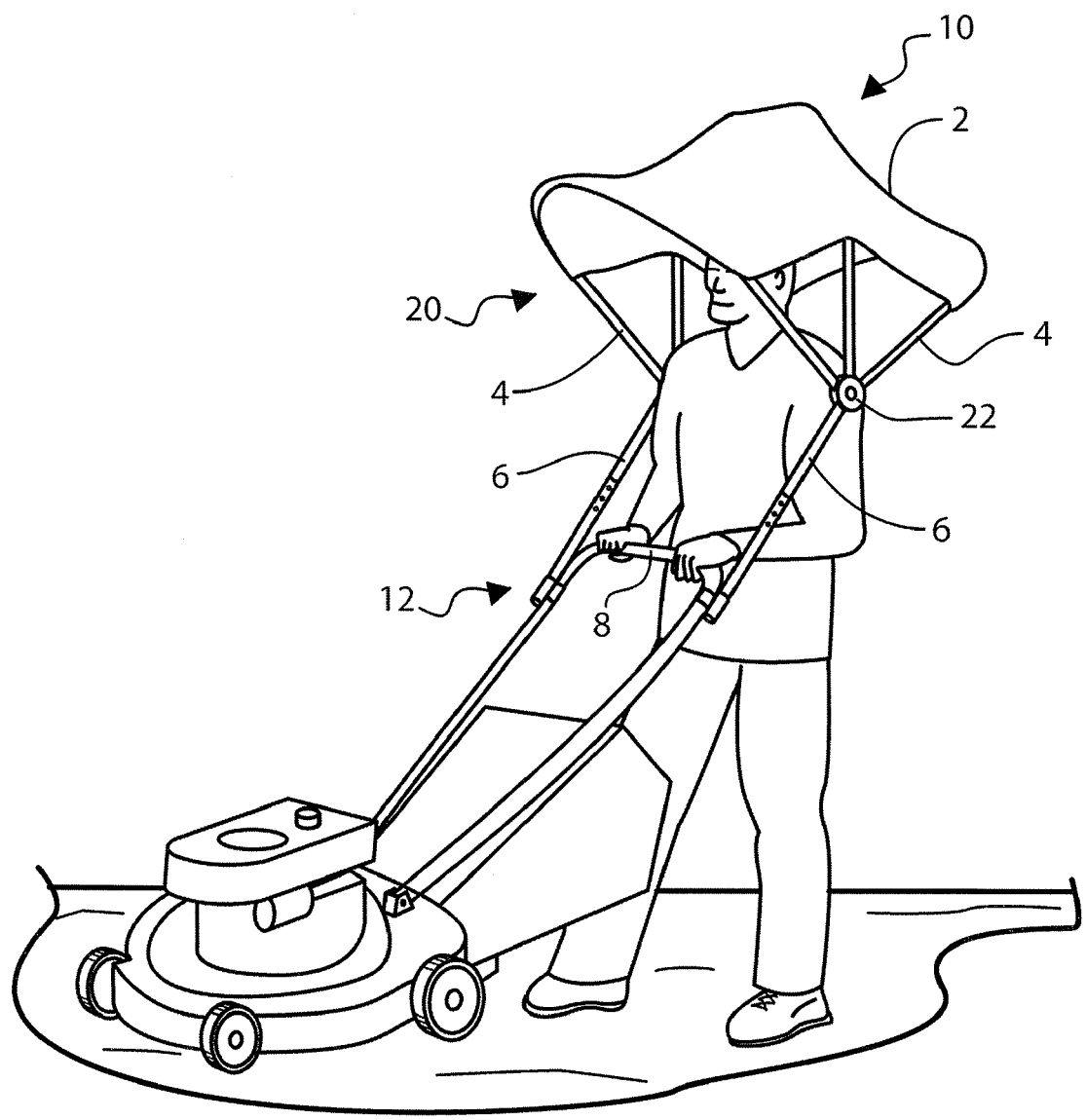
FIG. 6 is a perspective view of the apparatus shown in shown in FIG. 1 attached to a lawn mower with a person pushing the lawn mower.

BRIEF DESCRIPTION OF THE PRESENTLY PREFERRED AND VARIOUS ALTERNATIVE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

In a first aspect the present invention provides an apparatus, generally designated 10, for providing protection from rays from the sun while performing outdoor tasks including at least one of mowing a lawn with a lawn mower and pushing a stroller. The apparatus 10 comprises a sunshade 2 having a predetermined shape, a predetermined size and formed of a first predetermined material. A frame member, generally designated 20, includes at least two substantially U-shaped members 4 is engageable with an underside of the sunshade 2. The frame member 20 is formed of a second predetermined material. A respective one of a pair of elongated members 6 is engageable at a first end thereof with a respective end of one of the at least two substantially U-shaped members 4 and is further engageable on a second end with a handle 8 of such at least one of such lawn mower and such stroller. There is a means 12 for securing the pair of elongated members 6 to such handle 8 of such at least one of such lawn mower and such stroller.

It is presently preferred that such frame member 20 includes three substantially U-shaped members 4. It is also preferred that such U-shaped frame members 4 are pivotable in their connection to such elongated member 6 so that such three U-shaped members 4 can fold together when not in use. Such pivotable connection may also include a locking mechanism 22 so that they can be kept together when folded up and positioned properly when open up.

It is presently preferred that such first predetermined material for forming such sunshade 2 is plastic and even more preferred that such plastic is vinyl and that such vinyl is protective for UV rays. Such vinyl covers the portion of such U-shaped members 4 on both sides of the members 4 that is in contact with the vinyl. It is also preferred that such second predetermined material for forming such frame member 20 is aluminum and further that such elongated members 6 are tubular.

It is also preferred that such elongated members 6 include a telescoping means 14, as seen in FIG. 4, for adjusting the height of the sunshade 2 to accommodate users with different heights.

Such apparatus is between about four feet and about five feet measured from the connection of the elongated members 6 to such handle 8 of such lawnmower or stroller to a top of the apparatus. It is presently preferred that apparatus be approximately 4½ feet in length.

While a presently preferred embodiment and alternate embodiments of the present invention have been described in detail above, it should be understood that various other adaptations and/or modifications of the invention can be made by those persons who are particularly skilled in the art without departing from either the spirit of the invention or the scope of the appended claims.

We claim:

1. An apparatus for providing protection from rays from the sun while performing outdoor tasks including at least one of mowing a lawn with a lawn mower and pushing a stroller, said apparatus comprising:
    (a) a frame member including at least two substantially U-shaped members engageable with an underside of a sunshade member;
    (b) a pair of elongated members, each of said pair of substantially straight elongated members engageable at a first end thereof with a respective end of one of said at least two substantially U-shaped members and further engageable on a second end with a handle of the at least one of the lawn mower and the stroller;
    (c) a locking mechanism disposed on said first end of said each of said pair of elongated members so that said at least two substantially U-shaped members can be kept in a juxtaposed relationship with each other and with said pair of elongated members when folded up and positioned in a spaced apart relationship to each other when opened up; and
    (d) means for securing opposite ends of said each of said pair of elongated members to the handle of the at least one of the lawn mower and the stroller.

2. The apparatus, according to claim 1, wherein said elongated members are tubular.

3. The apparatus, according to claim 2, wherein said pair of elongated members further include a telescoping means for adjusting a height of said sunshade.

4. The apparatus, according to claim 1, wherein said apparatus is between about four feet and about five feet from a connection of said elongated members on such handle of such one of a lawnmower and a stroller to a top of said apparatus.

5. An apparatus for providing protection from rays from the sun while performing outdoor tasks including at least one of mowing a lawn with a lawn mower and pushing a stroller, said apparatus comprising:
    (a) a plurality of substantially U-shaped members;
    (b) a pair of locking mechanisms positioned in a spaced apart relationship to each other, each of said pair of locking mechanisms adapted to receive a free end of each of said plurality of substantially U-shaped members, so that at least two substantially U-shaped members pivot about said locking mechanisms between an operable first position for providing the protection from the rays from the sun while performing the outdoor tasks wherein at least middle portions of said at least two substantially U-shaped members are spaced apart from each other and a folded second position wherein said at least two substantially U-shaped members are juxtaposed in close proximity to each other along length thereof;
    (c) a pair of spaced-apart elongated members, each of said pair of spaced-apart elongated members having one end thereof received within a respective one of said pair of locking mechanisms so that at least two substantially U-shaped members pivot between said operable first position for providing the protection from the rays from the sun while performing the outdoor tasks wherein said pair of spaced-apart elongated members extend away from said plurality of substantially U-shaped members and said folded second position wherein said each of said pair of spaced-apart elongated members is juxtaposed in close proximity to a respective end portion of at least one of said plurality of substantially U-shaped members; and
    (d) means for securing opposite end of said each of said pair of elongated members to the handle of the at least one of the lawn mower and the stroller.

6. The apparatus, according to claim 5, wherein said plurality of substantially U-shaped members includes 3 substantially U-shaped members.

7. The apparatus, according to claim 5, wherein said means for securing said pair of elongated members to such handle of such at least one of such lawnmower and such stroller includes one of clamps and screws.

* * * * *